United States Patent
Zhang

(10) Patent No.: US 7,136,619 B2
(45) Date of Patent: Nov. 14, 2006

(54) MULTI-CHANNEL REDUNDANT WIRELESS NETWORK LINK AND DEVICE

(76) Inventor: Franklin Zhigang Zhang, 4808 Laurette St., Torrance, CA (US) 90503

( * ) Notice: Subject to any disclaimer, the term of this patent is extended or adjusted under 35 U.S.C. 154(b) by 448 days.

(21) Appl. No.: 10/008,948

(22) Filed: Dec. 6, 2001

(65) Prior Publication Data

US 2002/0072330 A1    Jun. 13, 2002

Related U.S. Application Data

(60) Provisional application No. 60/254,393, filed on Dec. 8, 2000.

(51) Int. Cl.
*H04B 7/15* (2006.01)
(52) U.S. Cl. .................. 455/11.1; 455/13.1; 455/8; 455/9; 455/500; 455/510; 455/553.1
(58) Field of Classification Search ............... 455/13.1, 455/8, 9, 509, 510, 500, 553.1
See application file for complete search history.

(56) References Cited

U.S. PATENT DOCUMENTS

| | | | | |
|---|---|---|---|---|
| 5,844,893 | A * | 12/1998 | Gollnick et al. | 370/329 |
| H001921 | H * | 11/2000 | Fletcher et al. | 455/433 |
| 6,272,120 | B1 * | 8/2001 | Alexander | 370/338 |
| 6,535,721 | B1 * | 3/2003 | Burke et al. | 455/137 |
| 6,567,855 | B1 * | 5/2003 | Tubbs et al. | 709/232 |
| 6,584,080 | B1 * | 6/2003 | Ganz et al. | 370/315 |
| 6,659,947 | B1 * | 12/2003 | Carter et al. | 600/300 |
| 6,665,536 | B1 * | 12/2003 | Mahany | 455/434 |
| 6,678,259 | B1 * | 1/2004 | Schwengler | 370/329 |
| 6,760,017 | B1 * | 7/2004 | Banerjee et al. | 345/179 |
| 6,829,214 | B1 * | 12/2004 | Marshall | 370/216 |
| 2004/0230875 | A1 * | 11/2004 | Kapauan et al. | 714/43 |
| 2005/0254475 | A1 * | 11/2005 | Kubler et al. | 370/338 |

FOREIGN PATENT DOCUMENTS

WO     WO9946908     *  2/1999

* cited by examiner

*Primary Examiner*—Matthew Anderson
*Assistant Examiner*—Sujatha Sharma

(57) ABSTRACT

A Multi-Channel Redundant Wireless Network Link (RWNL) device (10) comprises a plurality of wireless networking radio units, a processor unit, a radio control unit, and wired network units. Two RWNL devices communicating to each other form a multi-channel redundant wireless network communication link. The RWNL device aggrades the networking bandwidth of all its wireless networking units to become a big networking bandwidth. Network packets flow control means controls the networking packets transmitted between the wireless networking units and wired networking unit, the communication between the local wireless networking units to remote wireless networking units of the other RWNL. When the communication of one of the wireless networking channels failed to continue the communication, the flow control means will redistribute the packet flow among the remaining wireless networking radio units, shutdown the problem wireless networking channel, and report the networking status. Thus, as long as there is one wireless networking channel still functioning, the network link keeps communicating. The communication link has multiple redundancies.

5 Claims, 3 Drawing Sheets

US 7,136,619 B2

MULTI-CHANNEL REDUNDANT WIRELESS NETWORK LINK AND DEVICE

CROSS-REFERENCE TO RELATED APPLICATIONS

This application claims the benefit of the Provisional Patent Application Ser. No. 60/254,393 filed Dec. 8, 2000.

BACKGROUND

1. Field of Invention

This invention is concerned with outdoor wireless networking system and devices, specifically, an outdoor high bandwidth wireless network link with multiple redundancies.

2. Description of Prior Art

In the art of outdoor wireless network communication, the communication links among the wireless point of presence (WPOP) are to provide main bandwidth supply to the rest of the transmitting equipments which service the remote clients. This kind of network communication link is normally considered as backbone link for wireless networking. There are wired backbone link and wireless backbone links.

The basic requirements of the backbone link are high bandwidth and high reliability. A LMDS wireless communication system is a very common backbone link of wireless communication. To meet the requirements, a LMDS system uses high quality microwave components and other electronics parts to ensure high reliability. LMDS system also adopts high radio frequency band to provide the high bandwidth for the connectivity, and, a LMDS system is high cost and hard to deploy.

To improve the reliability of the backbone wireless communication, it is not enough by only improve the equipment quality itself; redundancy is a very important and common technology. Some LMDS radio systems have two-radio redundancy modular design. Sometimes, a third location of topology is established in order to achieve the redundancy of the whole communication. More high-grade equipments such as switches and routers need to be deployed to setup a third location redundancy.

In the prior art of the wireless backbone technology, cost and how to achieve the redundancy is a big issue. LMDS radio system itself is very expensive, the high frequency design causes users to pay bandwidth usage fee, and, further more, the high frequency microwave system cannot communicate over far distance. Setting up an third topology redundancy site, is not only extra high cost, but also, the suitable location is not always available. Accordingly, most wireless networks and their backbone are working in the non-redundancy status.

Obviously, a better solution is needed.

SUMMARY

A Multi-Channel Redundant Wireless Network Link (RWNL) device comprises a plurality of wireless networking radio units. Each of the plurality of the wireless networking radio units communicates with the correspondent radio unit of the remote RWNL device, and forms a child wireless link. Two RWNL devices communicating with each other form a multiple redundancies wireless network link. The multiple redundancies wireless network link aggregate the communication capability of the entire child wireless links to be a big redundant wireless network link.

Objects and Advantages

Accordingly, several objects and advantages of my invention are:
1) to provide ultra high reliable wireless network communication link with multiple redundancy;
2) to provide a high bandwidth low cost wireless communication backbone link and devices;
3) to provide longer distance of wireless backbone link;

The forgoing features and advantages of the present invention can be appreciated more fully from the following description, with references to the accompanying drawings in which.

SUMMARY

A Multi-Channel Redundant Wireless Network Link (RWNL) device comprises a plurality of wireless networking radio units. Each of the plurality of the wireless networking radio units communicates with the correspondent radio unit of the remote RWNL device, and forms a child wireless link. Two RWNL devices communicating with each other form a multiple redundancies wireless network link. The multiple redundancies wireless network link aggregate the communication capability of the entire child wireless links to be a big redundant wireless network link.

DESCRIPTION—Preferred Embodiment

Figure 1:
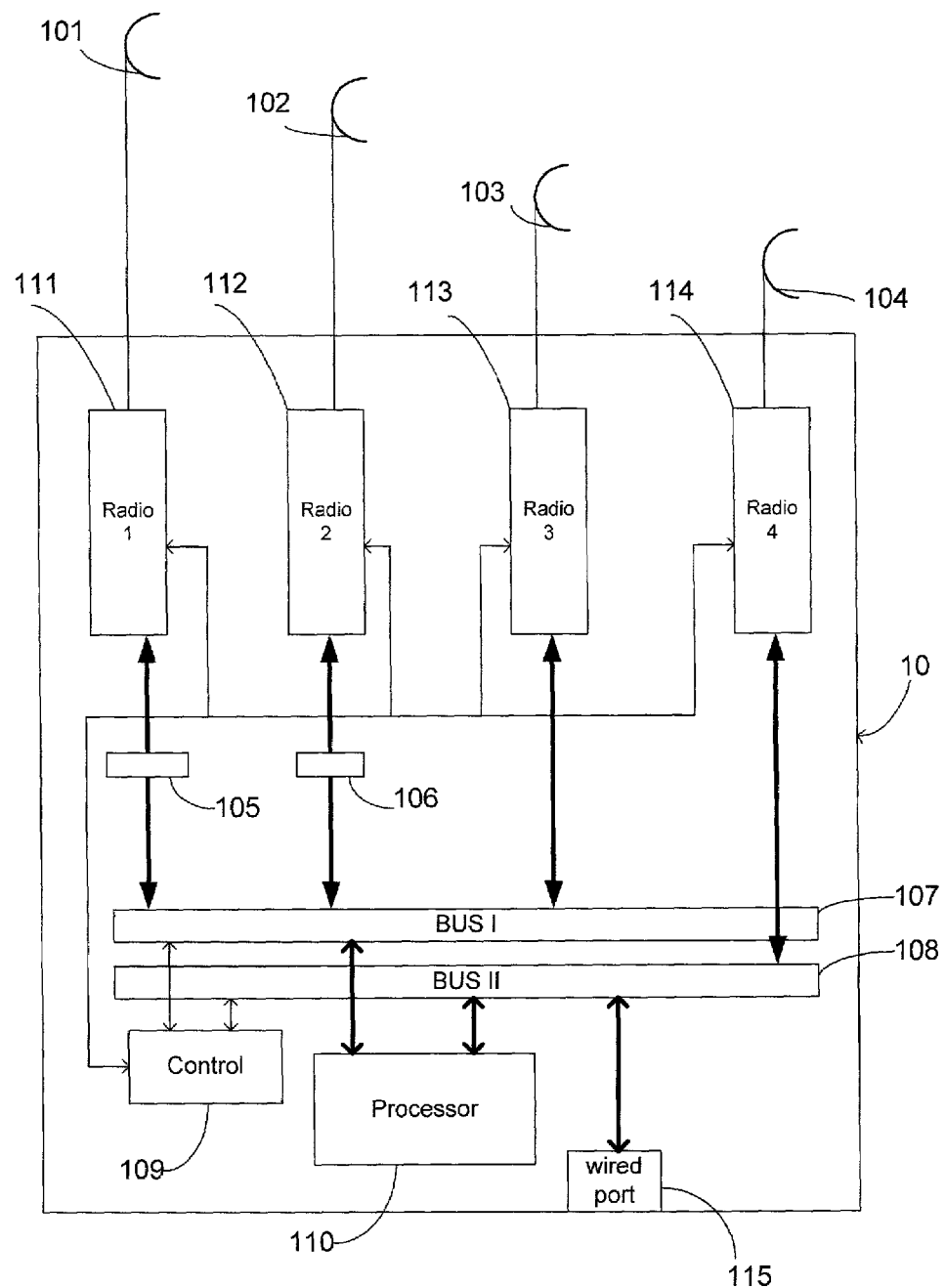
FIG. 1 is a block schematic diagram of a Multi-Channel Redundant Wireless Network Link device with 4 radio channels.

FIG. 1 is a block schematic diagram of a Multi-Channel Redundant Wireless Network Link (RWNL) device with 4 radio channels. As shown, the RWNL device 10 in this embodiment comprises four radio channels: radio1 111 and antenna 101 form the radio channel1; radio2 112 and antenna 102 form the radio channel2; radio3 113 and antenna 103 form the radio channel3; radio4 114 and antenna 104 form the radio channel 4. The RWNL device 10 may comprises two or more than two radio channels.

The microwave designs are required to ensure these channels will not interference with each other. In this embodiment, the RWNL device 10 also comprises a processor unit 110; a control unit 109; two system buses 107, 108; and a wired port unit 115 through which the RWNL device 10 can be connected to a LAN. For some types of the radio, the interface unit is needed. In this embodiment, radio1 111 is connected to BUS I 107 via the interface unit 105; radio2 112 is connected to BUS I 107 via the interface unit 106. Radio3 113 and radio4 114 do not require an interface, and are directly connected to BUS I 107 and BUS II 108.

Figure 2:
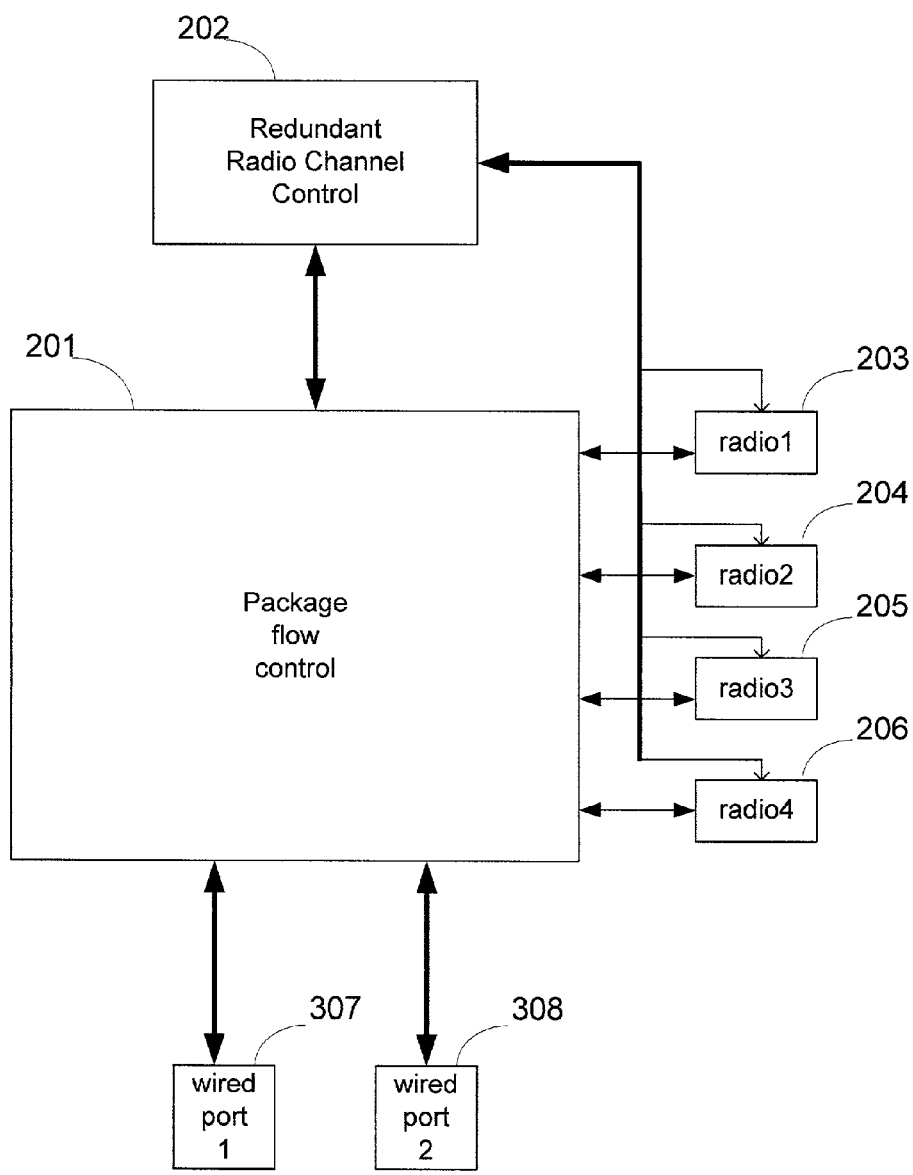
FIG. 2 is a schematic block representation of the system function of a RWNL device with 4 radio channels of the present invention.

FIG. 2 is a schematic block representation of the system function of a RWNL device with 4 radio channels of the present invention. The RWNL device may have more than one feature wired network port unit 307, 308, at least one of them are working at virtual port mode. The wired network port units receive and transmit the wired networking packets from/to the wired LAN. Once the wired port 307, 308 receive networking packets from LAN, they will hand over the packet to packet flow control unit 201 if the destination of the packet needs to be transmitted over the wireless link. Even though there are more than one wireless communication channel exist, the wired port unit always thinks the only one wireless channel to transmit the packets.

The packet flow control unit 201 represents to the wired port units 307, 308 as one wireless networking unit. When the packet flow control unit 201 receives the networking packets from the wired port units 307, 308, these packets are distributed through each of the multiple radio networking units. In this embodiment, the RWNL device comprises four radio-networking units 203, 204, 205, 206. The radio-networking unit 203 representing the functions of the radio1 channel 101 and 111 of the FIG. 1; The radio-networking unit 204 representing the functions of the radio2 channel 102 and 112 of the FIG. 1; The radio-networking unit 205 representing the functions of the radio3 channel 103 and 113 of the FIG. 1; the radio-networking unit 206 representing the functions of the radio4 channel 104 and 114 of the FIG. 1. Redundant radio channel control unit 202 is monitoring the radio-networking units all time. Once there is something happened to the radio-networking units, and the particular radio-networking unit must be blocked out, the redundant radio channel control unit 202 will block out the bad radio-networking unit and control the packet flow control unit 201 not to send any packet through out the bad radio-networking unit in the future. When the packet flow unit 201 receives packets from radio-networking units, it will repack packets and hand over to the wired ports 307, 308. The packet flow control unit 201 not only can interpret the packets between the wired and wireless networking units, but also aggregates the bandwidth of the radio-networking units and forms a virtual bigger radio-networking unit.

Figure 3:
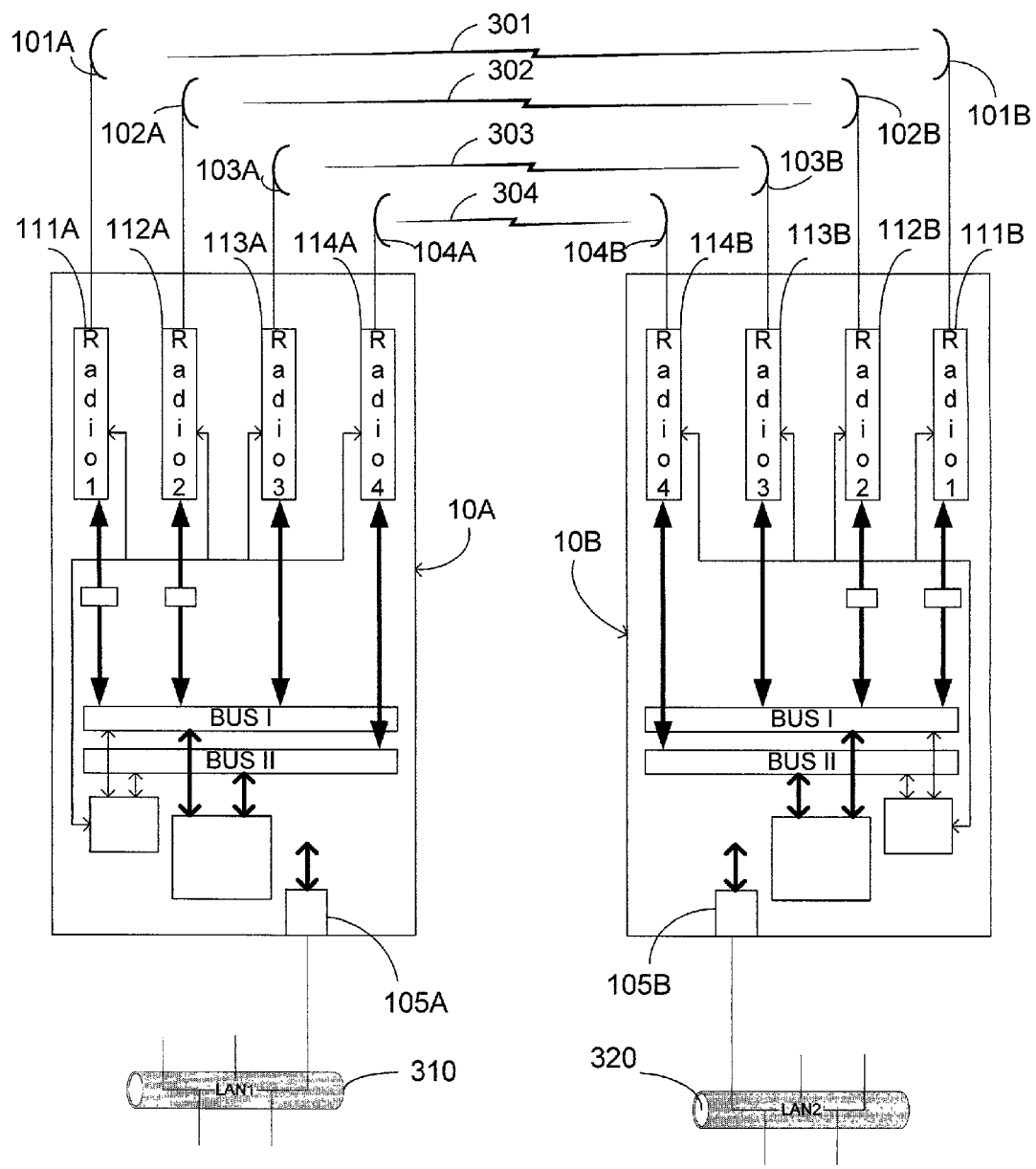
FIG. 3 is a schematic block representation of redundant wireless link formed by two RWNL devices with 4 radio channels.

FIG. 3 is a schematic block representation of redundant wireless link formed by two RWNL devices with 4 radio channels. In this embodiment, radio1 channel 111A and 101A of the RWNL device 10A is communicating with the radio1 channel 111B and 101B of the RWNL device 10B, and forms the wireless networking link 301; radio2 channel 112A and 102A of the RWNL device 10A is communicating with the radio2 channel 112B and 102B of the RWNL device 10B, and forms the wireless networking link 302; radio3 channel 113A and 103A of the RWNL device 10A is communicating with the radio3 channel 113B and 103B of the RWNL device 10B, and forms the wireless networking link 303; radio4 channel 114A and 104A of the RWNL device 10A is communicating with the radio4 channel 114B and 104B of the RWNL device 10B, and forms the wireless networking link 304. The RWNL device 10A is connected to LAN 310 by its wired networking port 105A. The RWNL device 10B is connected to LAN 320 by its wired networking port 105B. As shown, in this embodiment, LAN 310 and LAN 320 are linked together by the wireless links formed by the two RWNL devices 10A and 10B. By the bandwidth aggregation and redundancy control of the RWNL device 10A and 10B, the wireless networking links between the 10A and 10B are working as one big wireless link between the 10A and 10B. If there is one or more than one radio channel was shutdown by the redundant control unit, the link between LAN1 310 and LAN2 320 will be impacted by reducing the bandwidth and the two networks will keep linked together.

This embodiment is an example of the point-to-point connection. When using the point to multi-point radios as the radio channels, the RWNL device can work at point to multi-point mode with the same redundancy and bandwidth aggregation features.

Preferred Embodiment—Operation

When setting up two RWNL devices to form a wireless network communication link, each of the plurality of the wireless networking radio units and the antennas must be setup to communicate with remote RWNL device. When the link is communicating, each of the wireless network radio units is communicating with the correspondent radio unit of the remote RWNL device, and forms a child wireless link. The RWNL system is monitoring the performance status of each of the child links. The network flow control means controls and distributes the network packets among the child links. Once one of the plurality of the child links is under-performance or broken, the flow control means will keep control and distribute the network packets among the remaining child links. The RWNL devices will report the error, and keep the communication continuously. The links are still working with redundancy, until only one child link is functioning.

CONCLUSION, RAMIFICATIONS, AND SCOPE

It can be seen that, according to the invention, I have provided a high bandwidth wireless networking link and device with multi-channel redundancy. The link achieves high bandwidth by aggregating the bandwidth of its entire child wireless links. The link is high reliable multiple redundancy, because of all the child wireless links are redundancy to each other.

Furthermore, the Multi-Channel Redundant Wireless Network Link (RWNL) device has additional advantages in that:

When configured with point to multi point capability wireless networking radio units, the RWNL device can form a point to multi-point backbone multi redundancy links.

The redundancy of the Multi-Channel Redundant Wireless Network Link (RWNL) device is multiple instant redundancy, when child wireless link failed, the redundancy is carried out by redistribute the network packets flow control means. The whole link has less bandwidth throughput, and there is no network operation damage. The prior art of stand by dual modular redundant LMDS has a switch over redundancy delay, which may cause some network operation damage. Compared with a standby backup radio design, the RWNL device is much more robust.

Although the description above contains much specificity, these should not be construed as limiting the scope of the invention but as merely providing illustrations of some of the presently preferred embodiments of this invention. Various other embodiments and ramifications are possible within it's scope. For example:

By running proper flow control features, the RWNL device can turn into partially running as a high bandwidth backbone device, while having some other wireless radio units communicate with remote same type of wireless network radio devices.

One RWNL device can run as a central backbone device by have some of its plurality wireless networking radio units communicate with one remote device to form a redundant link, the rest of its plurality wireless networking radio units communicating with another remote device to form another redundant link.

All of the plurality wireless networking radio units can be different types of wireless networking radios, which are required not to interference with each other.

A RWNL device can be used at indoor environment.

A RWNL device can operate without the radio control unit.

Thus the scope of the invention should be determined by the appended claims and their legal equivalents, rather than by the examples given.

What is claimed is:

1. A multi-channel redundant wireless link (RWNL) device comprising:
   a processor unit;
   a system function means;
   a plurality of wireless networking units;
   a plurality of wired networking units;
   at least one system bus;
   whereby the said units are interconnected with each other via the said system bus, and
   whereby all the units are inside one enclosure with necessary connectors for connecting to the outside of the said enclosure, and
   wherein the system function means is the digital possessing function running primary in the processor unit and among all the other units, and
   wherein said wireless networking unit can communicate with remote wireless networking device, forming a wireless networking sub-link via antenna means, and
   wherein said system function means is running to control networking communication packets to be redistributed among all the wireless networking units for aggregating the networking bandwidth and providing redundancy among the wireless units, and
   wherein the said system function means is communicating between the said wireless and wired networking units in the same said RWNL device, and
   wherein the said system function mean is running to control networking packets to be redistributed among all the remaining communicating wireless networking sub-links and keeping communication between one RWNL device and one remote RWNL device when there is wireless networking sub-link that failed communication with remote networking device.

2. The said RWNL device of claim 1 may include a control unit for extending the system control to wireless networking units
   whereby said control unit connecting to system bus
   whereby said control unit connecting to said wireless networking units
   whereby said processor unit can extend the controlling capability via the control unit.

3. A point-to-point multi-channel fully redundant wireless networking link comprising:
   two multi-channel redundant wireless networking link (RWNL) devices of claim 1, and
   whereby one said RWNL device is connecting to one wired network via its wired networking unit, and
   Whereby the second RWNL device is connecting to another wired network via its wired networking unit, and
   Whereby said two RWNL devices communicating to each other wirelessly, and
   wherein one of the wireless networking units of the one said RWNL device communicating with remote corresponding wireless networking unit of the another said RWNL device form a wireless sub-link, and
   wherein the said system function means of said two RWNL devices coordinating each other when one of the wireless sub-links is having problem and to disable the said problem wireless sub-link, and wherein further the said system function means continuing to redistribute the networking traffic among the remaining sub-links forming a new virtual communication link, and
   Whereby two said wired networks connecting to each other via said virtual communication link redundantly.

4. A point-to-multi-point multi-channel full redundant wireless networking link comprising:
   One multi-channel redundant wireless networking link (RWNL) devices of claim 1 as master node
   A plurality of multichannel redundant wireless networking link (RWNL) devices of claim 1 as client nodes
   whereby said master RWNL device connecting to master wired network via its wired networking unit, and
   Whereby client RWNL device connecting to corresponding client wired networks via their own wired networking unit, and
      Whereby the said a plurality of RWNL client devices are communicating with the said RWNL master device wirelessly, and
   wherein one of the wireless networking units of said master RWNL device communicating with corresponding wireless networking unit of said client RWNL device forming a wireless sub-link, and
   wherein further the wireless networking unit of said master RWNL communicating with corresponding wireless networking units of multiple said client RWNL devices forming a wireless point-to-multiple-point sub-link, and
   wherein the said system function means in the RWNL device aggregating the networking bandwidth of the all the wireless sub-links forming a virtual bigger point-to-multiple-point networking link, and
   wherein the said system function means coordinating each other between the master RWNL device and client RWNL devices when one of the sub-links is having problem and to disable that said problem sub-link, and
      wherein further the control means continuing to redistribute the networking traffic among the remaining sub-links forming a new virtual point-to-multiple-point communication link, and
   Whereby said master wired networks connecting to client wired networks via said virtual communication link redundantly.

5. A point-to-multi-point multi-channel partial redundant wireless networking link comprising:
   one multi-channel redundant wireless networking link (RWNL) devices of claim 1 as master node
   A plurality of multi-channel redundant wireless networking link (RWNL) devices of claim 1 as client nodes
   whereby said master RWNL device connecting to master wired network via its wired networking unit, and
   Whereby client RWNL devices connecting to corresponding client wired networks via their own wired networking unit, and
      Whereby the said a plurality of RWNL client devices are communicating with the said RWNL master device wirelessly, and
   wherein further one group of wireless networking units of said master RWNL communicating with corresponding wireless networking units of multiple said client RWNL devices forming a wireless point-to-multiple-point sub-link group, and wherein further the other group of wireless networking units of said master RWNL communicating with corresponding wireless networking units of multiple said client RWNL devices forming the other wireless point-to-multiple-point sub-link group, and wherein the said system function means in the RWNL device aggregating the networking bandwidth of the all the wireless sib-links in the same said point-to-multiple-point sub-link group forming a virtual bigger point-to-multiple-point networking link, and wherein the said system function means coordinating each other between the master RWNL device and client RWNL devices of the same wireless point-to-multiple-point sub-link group when one of the sub-links is having problem and to disable that said problem sub-link, and wherein further the control means continuing to redistribute the networking traffic among the remaining sub-links of the same group forming a new virtual point-to-multiple-point communication link, and Whereby said master wired network connecting to client wired networks via said virtual communication link redundantly.

* * * * *